Sept. 21, 1965  W. T. BLAKE  3,207,324
RAILWAY CAR DRAFT APPLIANCE
Filed July 8, 1960  6 Sheets-Sheet 1

INVENTOR
William T. Blake

BY *John O. Evans, Jr.*
ATTORNEY

Sept. 21, 1965  W. T. BLAKE  3,207,324
RAILWAY CAR DRAFT APPLIANCE
Filed July 8, 1960  6 Sheets-Sheet 2
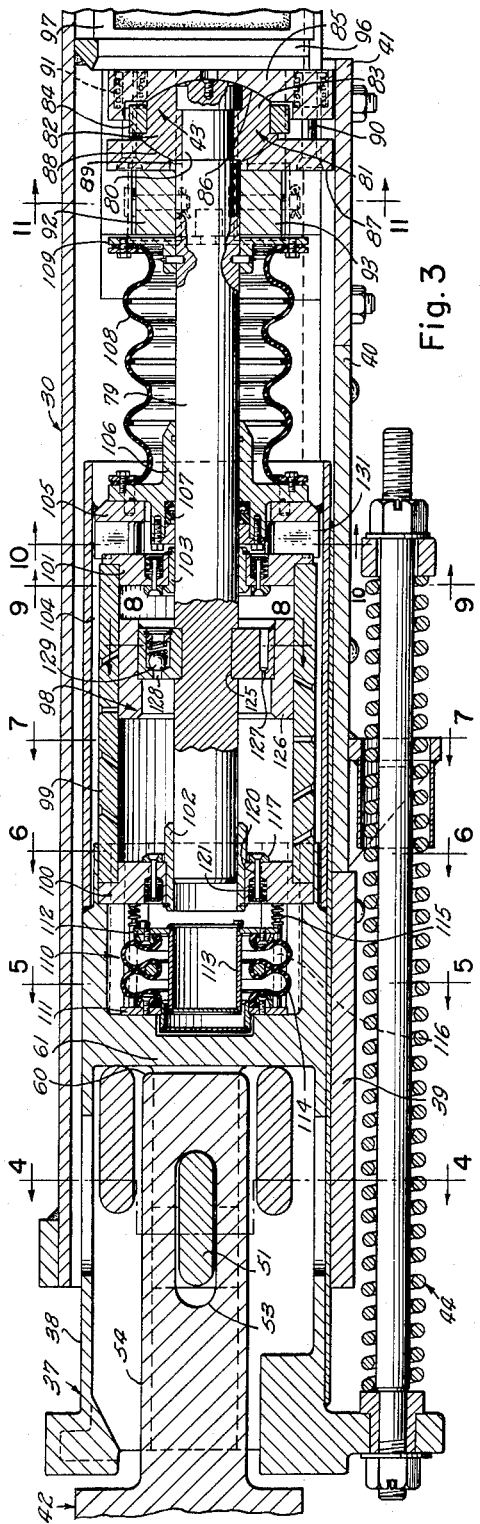
Fig. 3
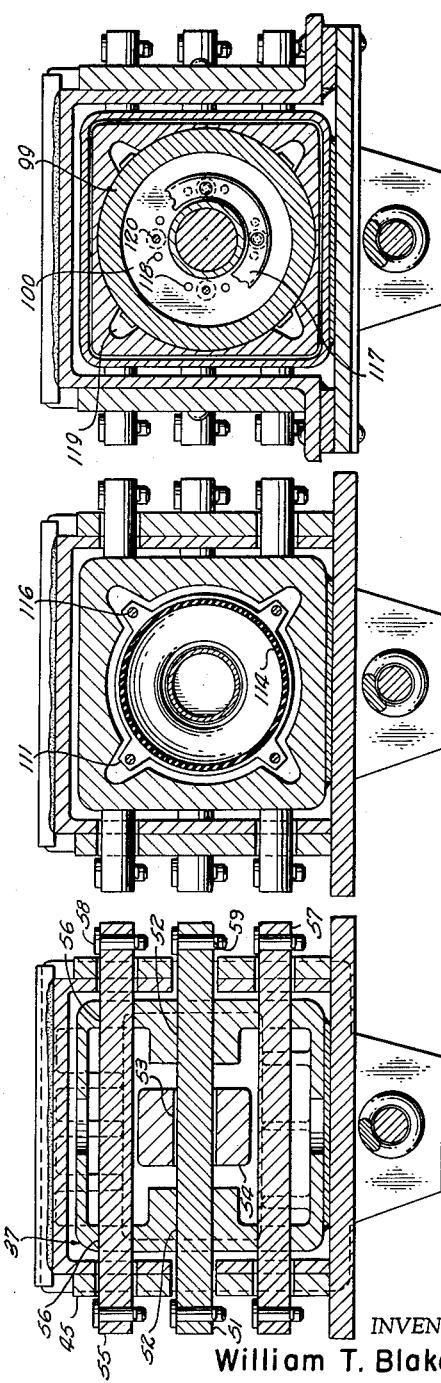
Fig. 6
Fig. 5
Fig. 4
INVENTOR
William T. Blake
BY John O. Evans, Jr.
ATTORNEY INVENTOR
William T. Blake BY John O. Evans, Jr.

ATTORNEY

Sept. 21, 1965    W. T. BLAKE    3,207,324
RAILWAY CAR DRAFT APPLIANCE
Filed July 8, 1960    6 Sheets-Sheet 4

INVENTOR
William T. Blake

BY John O. Evans, Jr.
ATTORNEY

Sept. 21, 1965  W. T. BLAKE  3,207,324
RAILWAY CAR DRAFT APPLIANCE
Filed July 8, 1960  6 Sheets-Sheet 5

INVENTOR
William T. Blake
BY John O. Evans, Jr.
ATTORNEY

*INVENTOR*
William T. Blake

BY John O. Evans, Jr.
ATTORNEY

United States Patent Office 3,207,324
Patented Sept. 21, 1965

3,207,324
RAILWAY CAR DRAFT APPLIANCE
William T. Blake, 4424 Morris Court, Fort Worth, Tex.
Filed July 8, 1960, Ser. No. 41,586
13 Claims. (Cl. 213—8)

This invention relates to railway draft appliances and more particularly to a railway draft gear incorporating a hydraulic buffer mechanism.

It is well known that railway cars, particularly freight cars, are subjected to many impacts or shocks of relatively great magnitude and that such impacts or shocks are amplified or multiplied by the number of cars in a given train. This is due in part to the fact that there is a certain amount of slack between the couplers of the cars. The cars tend to "bunch" or crowd together on slowing or stopping of the prime mover or engine, on down grades and on entering curves, whereby each car bumps the car forwardly thereof and the combined impact of all of said cars is transmitted to the slower traveling foremost car. On initial movement or acceleration of the engine, on up grades and on leaving curves, the cars tend to "stretch" or move away from one another so as to be jerked by the faster traveling cars thereahead and the combined stress or relative movement of all of the cars is exerted upon the rearmost car. Manifestly, these impacts or shocks damage the cars and particularly their contents as well as wear the couplers to thereby produce greater impacts or shocks in the future.

Moreover, when freight trains are made up, severe impact stresses are set up in the couplers and draft gear and great shocks are imparted to the contents of the cars when cars are moved into impact with each other in effecting coupling.

In my copending application Serial No. 600,977 filed July 30, 1956, for "Hydraulic Mechanism," there is disclosed a hydraulic buffer mechanism suitable for installation in railway cars to cushion the impacts and shocks to which the cars are subjected.

In my copending application Serial No. 673,238 filed July 30, 1956, for "Hydraulic Mechanism," there is disclosed a draft appliance for railway cars especially adapted to be mounted in the end of the car's center sill and which effectively cushions the impacts and shocks encountered in train operation.

The present invention relates to improvements in the hydraulic mechanism of my copending application Serial No. 600, 977, now Patent No. 2,944,639, and to improvements in the railway draft appliance of my copending application Serial No. 673,238, now Patent No. 2,944,681.

An object of the invention is to provide a draft appliance for railway cars adapted to reduce appreciably the impacts or shocks exerted on railway cars and their contents when such cars are made up into trains and the trains are moved upon the tracks.

A particular object of the invention is to provide an improved hydraulically-buffered draft appliance capable of being readily installed in the center sill of a conventional railway car.

Another object of the invention is to provide an improved draft appliance having means for mounting the hydraulic buffer mechanism in the railway car so that the buffer mechanism will function properly under all conditions of train operation and so that the buffer mechanism will be properly protected from undue stresses.

An important object of the invention is to provide an improved arrangement for attaching a coupler to the draft appliance of the present invention.

Another object of the invention is to provide an improved draft appliance that will slide readily in the center sill of a railway car without binding.

Another object of the invention is to provide a conveniently accessible return spring mechanism for the sliding subassembly of a railway car draft appliance.

A further object is to provide a railway draft appliance having a double-acting hydraulic buffer mechanism, the piston of which has a valve therein for relieving excessive fluid pressures when large buff forces are applied to the appliance.

A still further object of the invention is to provide a dust protector for the piston rod of a hydraulic mechanism, which dust protector is in the form of a bellows having a valve which regulates pressure within the bellows.

In general, the draft appliance of the invention is slidably mounted in one end of the center sill of a railway car. A coupler is attached to the sliding member of the assembly by means of a transverse coupler key. This key rides in longitudinal slots in the sides of the center sill, and the scope of the longitudinal movement desired for the sliding member requires that the slots be open at their front ends so that the key, when the apparatus is in full draft position, extends forwardly of the open ends of the slots. The sliding member is provided with another transverse key or keys which ride in other slots in the sides of the center sill, which other slots are closed at their front ends so that such other key transmits draft forces from the sliding member to the center sill.

The draft appliance of the present invention also has a return spring mechanism located underneath the center sill in a position where it may be readily adjusted.

A spring-pressed check valve is installed in the piston of the hydraulic mechanism of the draft appliance. This check valve is oriented to open when the draft appliance is subjected to severe impact force to relieve high fluid pressure in one end of the cylinder.

The draft appliance of the invention has a dust protector bellows surrounding the piston rod externally of the housing, the bellows being sealed to the housing and to the piston rod. In order to prevent the build-up of high gas pressures within the bellows, a spring-biased check valve closes an opening through a wall of the bellows assembly. This check valve is disposed to close upon expansion of the bellows and to open upon contraction thereof to vent excess air from the interior of the bellows to the atmosphere.

In the drawings:

FIG. 3 is a vertical, longitudinal, sectional view, on an enlarged scale, taken along the line 3—3 of FIG. 1;

Figure 12:
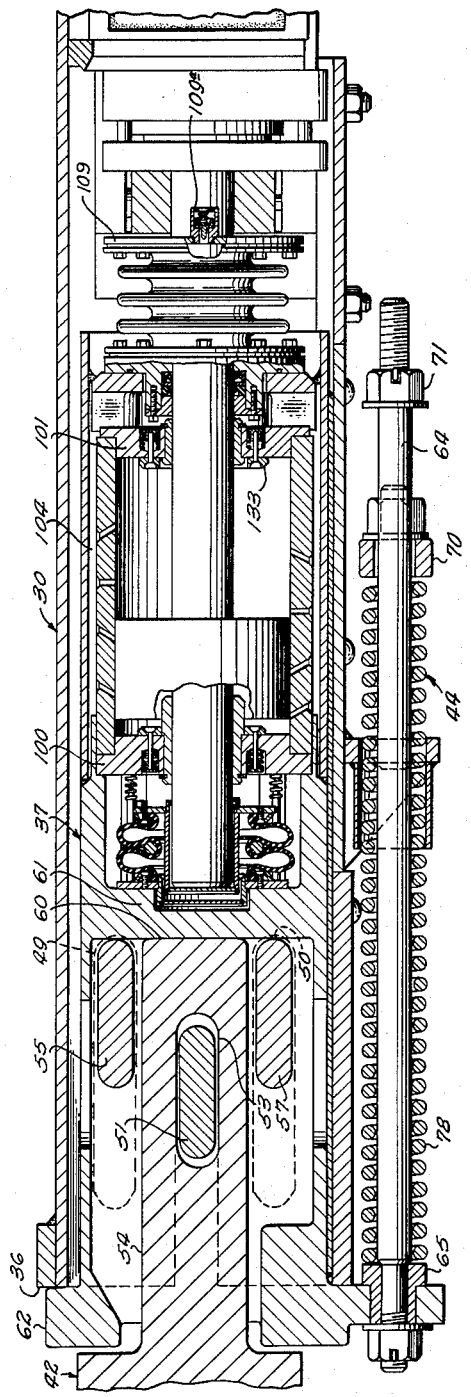
Figure 16:
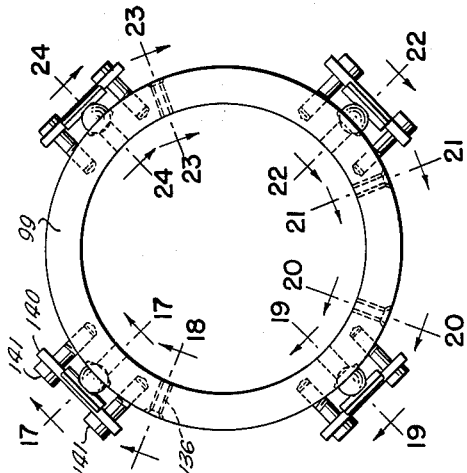
Figure 15:
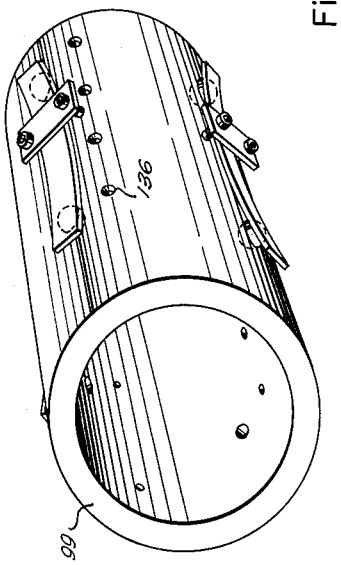
Figures 13, 14:
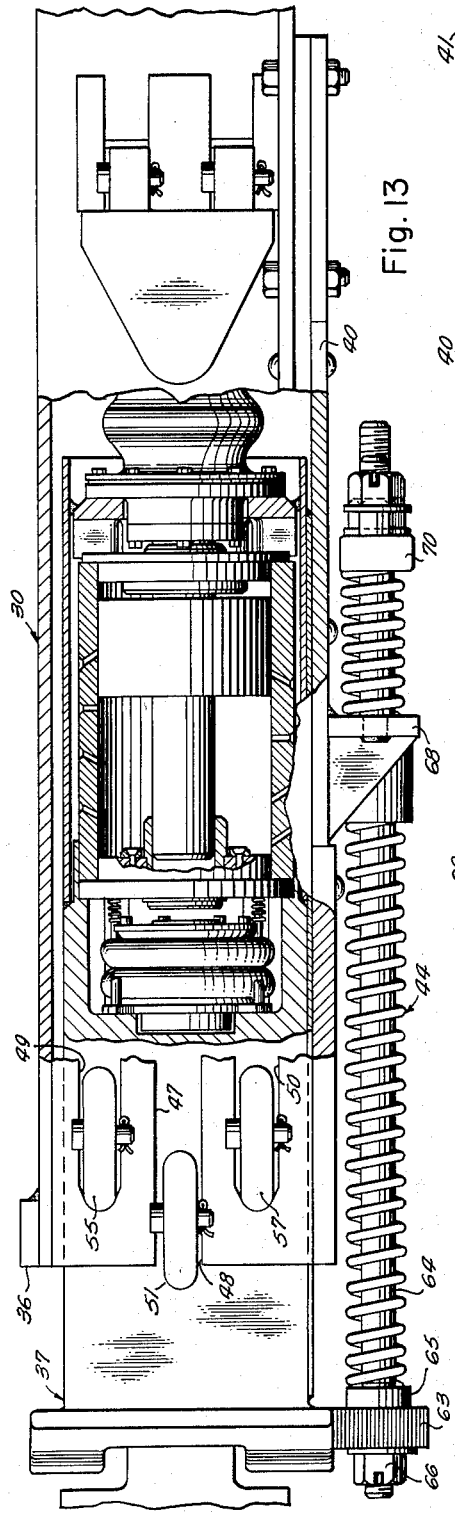

FIGS. 4 through 11 are sectional views taken along the lines 4—4 through 11—11 of FIG. 3, respectively;

FIG. 12 is a vertical, longitudinal, sectional view similar to FIG. 3 showing the mechanism in a different operative position;

FIG. 13 is an elevational view similar to FIG. 3, parts being broken away to show interior construction, the mechanism being shown in still another operative position;

FIG. 14 is a bottom view of the assembly with the mechanism in the same position as in FIG. 13;

FIG. 15 is a perspective view of the workilng cylinder of the apparatus, looking from the rear quarter;

FIG. 16 is a rear end view of the working cylinder of FIG. 15 on an enlarged scale; and FIGS. 17 to 24 are sectional views taken along the lines 17—17 to 24—24 of FIG. 16, respectively.

Figure 1:
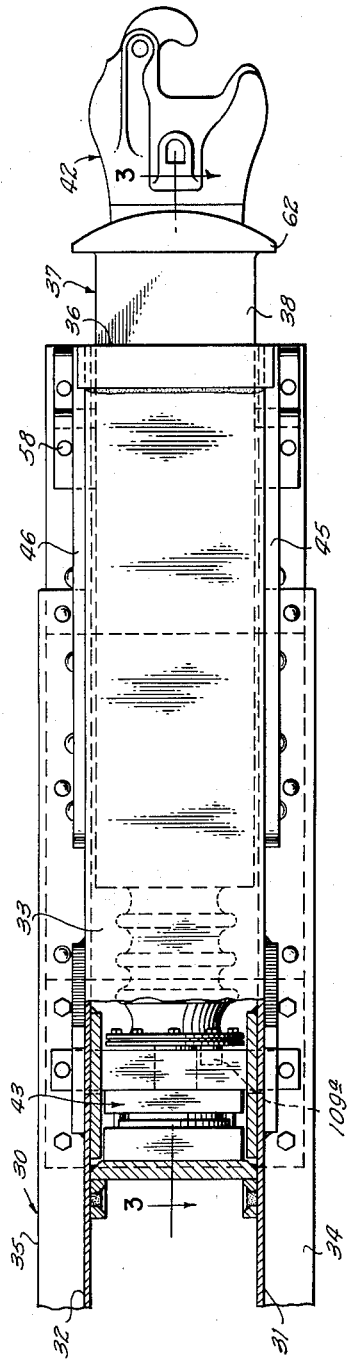
FIG. 1 is a plan view of one end of a railway car center still having installed therein a draft appliance in accordance with the invention, a portion of the center still being broken away to show internal structure.
Figure 2:
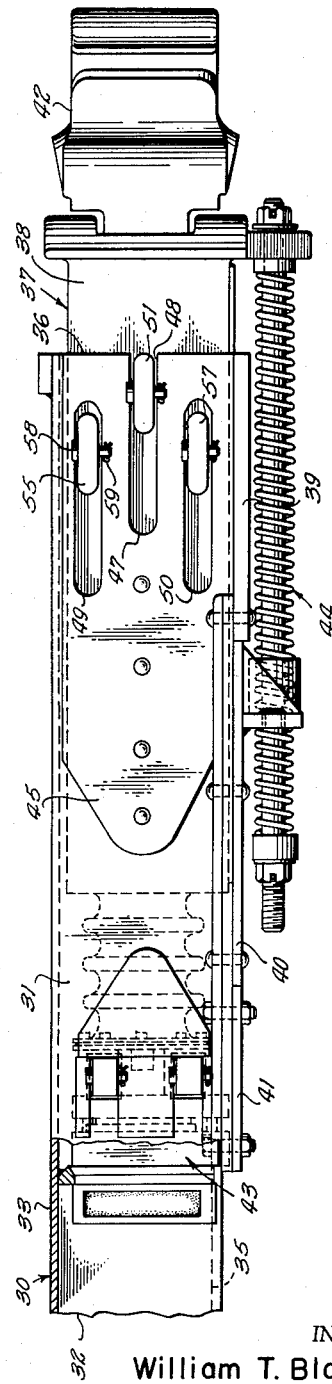
FIG. 2 is an elevational view of the assembly shown in FIG. 1 with a portion of the center still being broken away to show interior construction.

Referring to the drawings, particularly to FIGS. 1 and 2 thereof, the railway car draft appliance of the invention is shown as being installed in one end of a conventional railway car center sill 30. Since such a center still is well known in the prior art, it will be understood that it provides the main support for the car body which is mounted on top thereof and that it, in turn, is supported on the usual bolsters and trucks, the wheels of which ride upon the track rails. The center sill 30 has longitudinal side members 31 and 32 and a top plate 33. The center sill is open at the bottom and the side members have outwardly extending bottom flanges 34 and 35, As is conventional, the end 36 of the center sill is open. It is seen that the center sill 30 provides a longitudinal hollow pocket 30a adjacent the end of the sill, this pocket having an open end 36. It will be understood that the other end of the center sill, not shown, is similarly constructed and is also open.

A draft appliance in accordance with the invention, designated by the general reference numeral 37, is mounted in each end of the center sill 30, only one such appliance being shown. The draft appliance has a housing 38 that is substantially square in transverse cross-section and that is received in the end of the center sill with a free sliding fit. The housing is slidably supported on cross plates 39, 40 and 41 riveted or bolted to the underside of the center sill flanges 34 and 35. A standard car coupler 42 projects from the end of the housing 38. As will appear more fully hereinafter, the housing 38 contains a double-acting hydraulic buffer mechanism, the piston rod of which is fixedly anchored to the center sill 30 by a structure designated by the general reference numeral 43. A spring mechanism, having the general reference numeral 44, serves to urge the housing 38 to return to the neutral position illustrated in FIGS. 1 and 2 when the housing is longitudinally displaced.

The structure by which draft and buff forces are applied from the coupler 42 directly to the center sill, as distinguished from their transmission to the center sill through the hydraulic buffer mechanism, will be described with reference to FIGS. 1 to 4, 12 and 13. As seen in FIGS. 1 and 2, the side members 31 and 32 of the center sill are strengthened by reinforcing plates 45 and 46 riveted to the side members. A central longitudinal slot 47 is cut through the reinforcing plate 45 and the side member 31, this slot being open, as shown at 48, through the end 36 of the center sill. Upper and lower longitudinal slots 49 and 50 are also cut through the reinforcing plate and side member, these slots being closed at both ends. Corresponding slots are provided in the reinforcing plate 46 and center sill side member 32 laterally opposite the aforementioned slots. A coupler shank key 51 extends through the central slots 47 and transversely through the housing 38 as seen in FIG. 4. This coupler key is snugly received in keyways 52 in the sides of the housing 38. The coupler key 51 passes with a fairly loose fit through a transverse slot 53 in the shank 54 of the coupler 42 so that the coupler may pivot to a limited extent on the key.

Another key 55 passes transversely through the housing 38 and through the upper longitudinal slots in the sides of the center sill. This key is loosely received in these slots and fits snugly in slots 56 in the side walls of housing 38. A key 57, similar to the key 55, is similarly associated with the lower longitudinal slots in the sides of the center sill and with the housing 38. The keys 51, 55 and 57 are prevented from moving transversely to any substantial extent by means of retainer pins 58 inserted through holes in the outer ends of the keys and the pins being retained in the holes by cotter keys 59.

Turning to FIG. 12, showing the draft appliance in full buff position, it will be seen that, with buff forces being applied to the coupler 42, the inner end 60 of the coupler shank 54 is in abutment with a transverse partition 61 extending across the interior of the housing 38. The coupler key 51 does not touch either the front or rear end of the slot 53 in the coupler shank. The front end of the housing 38 has a flange 62 that is in abutment with the front end 36 of the center sill 30. Upper and lower keys 55 and 57 do not touch the rear ends of the respective slots 49 and 50 formed in the sides of the center sill. It is thus seen that buff forces are applied through the coupler 42 to the transverse partition 61 of the housing and, thence, through the forwardly extending side walls of the housing and the flange 62 to the end 36 of the center sill. Rearward movement of the housing 38 in the center sill is thus limited by abutment of the flange 62 with the front end 36 of the center sill.

With draft forces applied to the coupler 42, as may be visualized from FIG. 3, the coupler is moved forwardly to a point at which the rear end of the transverse slot 53 in the coupler shank is in contact with the coupler key 51 and the inner end 60 of the shank is spaced forwardly a short distance from the transverse housing partition 61. Draft forces are applied to the housing through the key 51 which fits snugly in the keyways in the side walls of the housing.

Referring to FIG. 13, showing the housing in its full draft position, it is seen that the upper and lower keys 55 and 57 abut the front ends of their respective slots 49 and 50 to transmit draft forces directly from the housing to the center sill 30. It will be noted that the front end of the coupler key 51 projects forwardly of the front end 36 of the center sill through the open end 48 of the central longitudinal slot 47. It is thus seen that, in the full forward position of the housing, draft forces are transmitted from the coupler to the center sill through the key 51, the side walls of housing 38, and the upper and lower transverse keys 55 and 57. Forward movement of the housing in the center sill is limited by abutment of keys 55 and 57 with the forward ends of their respective slots 49 and 50.

The foregoing construction permits the employment of a coupler having a shorter shank than the coupler used with a single key arrangement such as is disclosed in my aforementioned U.S. application Serial No. 673,238. In said prior application, the slot in the center sill in which the single key slides terminates rearwardly of the outer end of the center sill. The key abuts the outer end of the slot when the housing is in full draft position to transmit draft forces directly from the coupler through the key to the center sill. In the present construction, since the coupler may have a shorter shank, it is correspondingly stronger and less subject to damage or breakage.

The spring mechanism 44 for returning the housing 38 to neutral position will now be explained with particular reference to FIGS. 3 and 12 to 14. Referring to FIGS. 13 and 14, it will be seen that the housing flange 62 has a depending ear 63. A tie rod 64 having a collar 65 has one end inserted through a hole in the ear 63, the tie rod being fixed to the ear by a nut 66 threaded to the end of the rod. The tie rod passes through a hole 67 in a bracket 68 welded or otherwise suitably secured to the bottom of the cross plate 40. The inner end of the tie rod is slidably received in a hole 69 in a yoke bar 70. A nut 71 is threaded to the inner end of the tie rod and, as seen in FIGS. 13 and 14, this nut bears against the rear surface of the yoke bar 70.

The yoke bar is slidable on a pair of guide rods 72 and 73 fixed at their front ends to the bracket 68 and having nuts 74 and 75, respectively, threaded to the rear ends of the guide rods. Helical springs 76 and 77 surround the guide rods and are compressed between the bracket 68 and the yoke bar 70. A longer compression spring 78 surrounds the tie rod 64 and is compressed between the collar 65 of the tie rod and the front face of the yoke bar 70. This spring 78 passes freely through hole 67 in the bracket 68.

It will be seen from FIGS. 13 and 14 that, in the full draft position of the housing, the short springs 76 and 77 are under compression and tend to move the yoke bar 70 rearwardly into abutment with the nuts 74 and 75 to restore the housing 38 to the neutral position of FIG. 3.

When the housing has moved to the full buff position of FIG. 12, the tie rod 64 moves to a position wherein the nut 71 is spaced rearwardly from the yoke bar and the long spring 78 is under compression between the collar 65 and the yoke bar 70. Thus, the long spring 78 tends to restore the housing 38 from the full buff position of FIG. 12 to the neutral position of FIG. 3. The restoring spring mechanism 44 is conveniently located beneath the cross plates 39 to 41 in a position below the center sill in which it is readily accessible for adjustment or repair.

Figure 11:
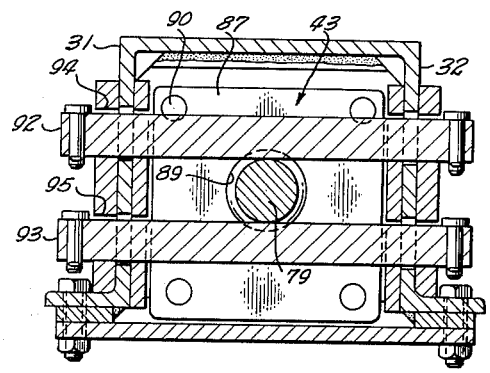

The anchor structure 43 for securing the piston rod 79 of the hydraulic mechanism to the center sill will now be described with particular reference to FIGS. 3 and 11. The piston rod has a circumferential groove 80 formed therein near the inner end. An anchor knob 81 is secured to the end of the piston rod, the knob being formed of an upper, generally hemispherical part 82 and a lower, generally hemispherical part 83. These parts have flanges fitting into the groove 80 on the piston rod and are held in place on the piston rod by a ring member 84 surrounding the parts 82 and 83. The front and rear surfaces of the knob 81 are spherical, as indicated in FIG. 3. A buff plate 85 having a forwardly facing, spherical concavity 86 corresponding in curvature to the rear face of the knob 81 abuts such rear face. In contact with the forward face of the knob 81 is a draft plate 87 having a spherical concavity 88 formed in its rear face and conforming to the forward face of the knob. The draft plate has a central opening 89 through which the piston rod 79 passes freely. The buff and draft plates are resiliently clamped about the knob by means of pins 90 and compression springs 91 that urge the plates together. Transverse bars 92 and 93 extend in contact with the front face of the draft plate 87 and are snugly received in holes 94 and 95 in the side members 31 and 32 of the center sill. These bars prevent forward movement of the draft plate 87 and the piston rod 79.

Rearward movement of the piston rod and the buff plate 85 is prevented by a stop plate 96 which is in contact with the rear face of the buff plate and which is rigidly secured to the center sill by being welded thereto. The stop plate 96 is reinforced against rearward movement by vertical members 97 welded to the side members of the center sill.

The anchor structure 43 imposes no radial forces on the knob 81 and permits the piston rod 79 to center itself longitudinally in the center sill. To this end, the buff and draft plates 85 and 87, respectively, are free to move transversely of the center sill to a limited extent by sliding between the stop plate 96 and the transverse bars 92, 93. Also, the buff and draft plates can pivot universally to a limited degree on the anchor knob 81. Thus, sufficient unrestricted lateral movement of the piston rod is afforded to allow the piston rod to seek its own center without being subjected to undesired transverse forces.

Between the forward and rearward limits of movement of the housing 38, housing motion is cushioned by a double-acting hydraulic mechanism. Referring to FIG. 3, the hydraulic mechanism shown has its piston rod 79 anchored to the center sill as described hereinbefore. The piston rod carries a piston 98 slidable in a working cylinder 99. The ends of the working cylinder are closed by a front cylinder head 100 and a rear cylinder head 101. The forward end of the piston rod is slidably received in a bushing 102 in the front cylinder head and the rear end of the rod is slidable in another bushing 103 in the rear cylinder head. The working cylinder is mounted in a sealed chamber 104 in the housing 38. The chamber is closed at the rear by a plate 105 welded into the housing 38, and the front end of the chamber is closed by the transverse partition 61 forming a part of the housing.

The piston rod 79 slides in a bushing 106 secured to the plate 105 and is sealed in the bushing by packing 107. A flexible bellows sleeve 108 protects the bushing 106 and the piston rod from external dust and moisture. This bellows sleeve is sealingly secured between the bushing 106 and a disc 109 fixed to the piston rod. In order that the bellows may breathe, an outwardly-opening, spring-closed check valve 109a is provided in the bellows plate 109, as shown in FIG. 12. This valve 109a closes when the bellows is extended and opens when the bellows is compressed. The spring tending to close the check valve 109a is a lightweight spring such that the valve will open under low superatmospheric pressure within the bellows, which pressure is well below the pressure which would sensibly expand the bellows laterally. At full extension of the bellows, the internal pressure is somewhat below the pressure of the surrounding atmosphere. A small quantity of lubricating oil may be put inside the bellows for the purpose of lubricating the piston rod.

Reverting to FIG. 3, the chamber 104 within the housing and the working cylinder 99 are completely filled with a hydraulic fluid such as oil. Changes in volume of the chamber occasioned by movement of the piston rod into and out of the chamber and by temperature changes are compensated by a compensating device generally indicated by the reference numeral 110. The compensating device is a hermetically sealed, expansible and contractible capsule filled with air or other inert gas. The compensating device has a front plate 111, as seen also in FIG. 5, and a rear plate 112 having a rearwardly open cup member 113 welded thereto. Between these plate members a length of flexible tubular bellows 114 is secured. The front and rear plates of the compensating unit move longitudinally with respect to each other while maintaining the gas confined within the device. The compensating device is positioned in the front end of the chamber 104 between the partition 61 and the front cylinder head 100 by means of springs 115 pressing between the cylinder head and four external legs 116 attached to the front plate 111 of the compensating device.

In assembling the compensating device 110, the device is sealed when it is in a position about half way between its fully contracted and fully extended positions. The air thus enclosed in the device is at atmospheric pressure. When the device is collapsed to its fully contracted position, the internal pressure is increased above atmospheric pressure and when the device is expanded to its fully extended position, the internal pressure is reduced to below atmospheric pressure. The total pressure change is ordinarily less than one atmosphere. The size of the compensating device is related primarily to the displacement of the piston rod 79 between its extreme in and out positions, the change in volume of the compensating device between the fully contracted and the fully extended positions being substantially equal to the piston rod displacement. When the housing 38 is in the full rearward position, as shown in FIG. 12, the front end of the piston rod 79 abuts the bottom of the cup member 113 of the compensating unit. As seen in FIG. 3, when the housing is in the neutral position, the bottom of the cup member has pulled away from the front end of the piston rod and the compensating unit has expanded to compensate for withdrawal of the piston rod from the housing. In assembling the apparatus, the hydraulic mechanism is completely filled with hydraulic fluid, through filler openings to be described, when the parts are in the position shown in FIG. 12 with the compensating unit moved to fully contracted position by the front end of the piston rod. Thus, the correct quantity of hydraulic fluid is introduced. Then, upon maximum withdrawal of the piston rod from the housing, the compensating unit will expand to compensate therefor.

Changes in internal volume of the hydraulic system due to temperature changes are relatively small compared to those due to piston rod displacement and are readily accommodated by the compensating unit 110.

Referring to FIGS. 3 and 6, the front cylinder head 100 is seen as having an inwardly opening check valve 117. The valve 117 is ring-shaped and, when closed, covers the several valve ports 118 which extend through the cylinder head and place the interior of the cylinder in communication with the chamber 104 in front of this cylinder head. The annular portion of the chamber 104 that surrounds the cylinder is in communication with the portion of the chamber in front of the head through the passageways 119. The ring valve 117 has valve rods 120 which slide in corresponding holes in the cylinder head and the valve is urged to closed position by springs 121 surrounding the valve rods and acting between the rods and the cylinder head.

Figure 7:
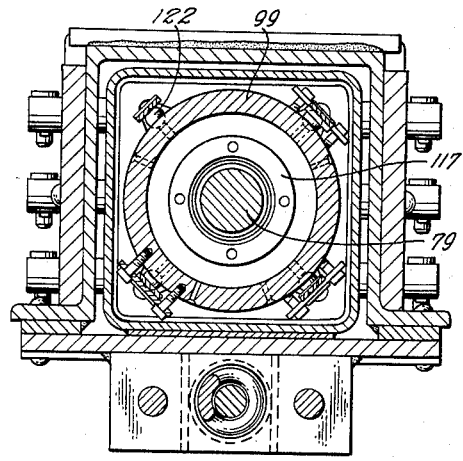

Referring to FIGS. 3 and 7, the working cylinder 99 is shown as having a number of high pressure relief valves 122 about the periphery of the cylinder. These high pressure relief valves will be described more fully hereinafter.

Figure 8:
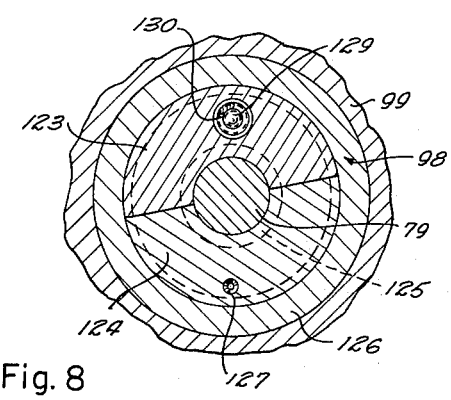

Referring to FIGS. 3 and 8, the piston 98 has a central portion consisting of two semicylindrical members 123 and 124 fitted into a groove 125 provided in the piston rod 79 and an outer annular member 126 fitted over the members 123 and 124 and welded thereto. The outer periphery of the annular member 126 slides on the inner wall of the working cylinder. The piston member 124 is provided with a small fixed opening 127 extending therethrough and the piston member 123 has another opening 128 extending longitudinally therethrough. The opening 128 is closed by ball check valve 129, the ball being urged to close the opening 128 by spring 130. The purpose of the openings 127 and 128 will be more particularly described hereinafter.

Figure 9:
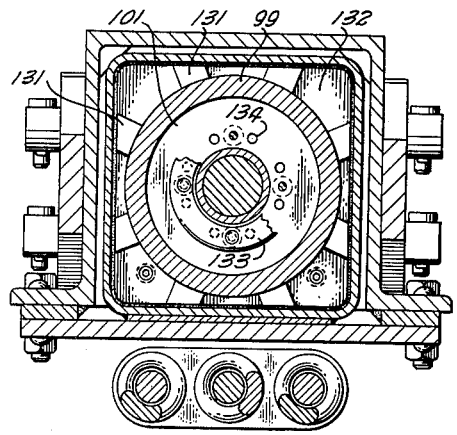

With reference to FIGS. 3 and 9, it will be seen that the rear cylinder head 101 is supported on projections 131 formed integrally with the plate 105 that closes the rear of the housing. The projections are spaced circumferentially of the cylinder and provide spaces 132 therebetween through which fluid communication is established between the annular portion of the chamber 104 about the cylinder 99 and the portion of the chamber at the rear of the rear cylinder head 101. FIG. 9 also shows an inwardly opening ring check valve 133 having ports 134 communicating the interior of the working cylinder with that portion of the chamber 104 at the rear of the rear cylinder head 101.

Figure 10:
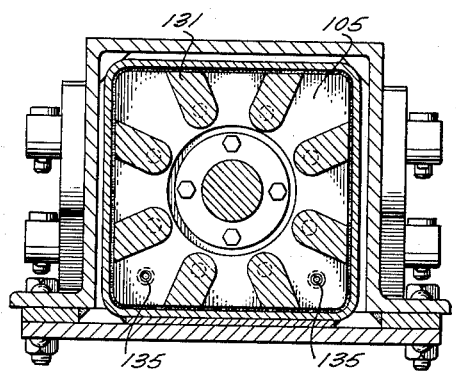

As shown in FIGS. 3 and 10, the plate 105 closing the rear end of the housing has filler openings closed by removable plugs 135 for the purpose of filling the chamber and cylinder with hydraulic fluid.

Figure 20:
Figure 21:
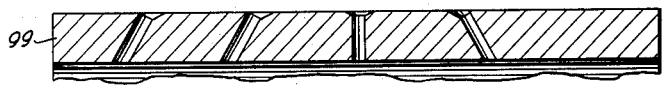

The construction of the working cylinder 99 will now be further described with reference to FIGS. 15 through 24. As seen in FIGS. 15 and 16, the working cylinder provides a number of fixed openings 136 therethrough. Referring to FIGS. 18, 20, 21 and 23, it is seen that the openings in the front half of the cylinder wall are inclined rearwardly in an outward direction. Those openings about halfway between the ends of the cylinder are substantially radially disposed, as seen in FIGS. 20, 21 and 23. The fixed openings in the rear half of the cylinder are inclined forwardly in an outward direction. Thus, hydraulic fluid that is expressed outwardly through the fixed openings 136 in the front half of the cylinder is directed to the rear so that it may flow with the least possible disturbance rearwardly to re-enter the cylinder through the fixed openings to the rear of the piston and through the inwardly opening ring check valve 133 in the rear cylinder head 101, as will be appreciated from coonsideration of FIG. 12. It will be understood that as the housing moves to the rear, the check valve 133 opens due to the inwardly directed pressure differential existing thereacross to allow return circulation of fluid and to prevent the drawing of a vacuum in the rear end of the cylinder and the building up of excessive pressures in the chamber 104 surrounding the working cylinder.

The reverse action occurs when the housing is moved in a forward direction. Hydraulic fluid is expressed through the fixed openings at the rear of the piston. This fluid travels forwardly around the piston and returns into the forward end of the cylinder through the openings 136 in the front end of the cylinder and through the check valve 117 in the front cylinder head 100. As the cylinder moves forwardly over the piston, the check valve 133 at the rear is closed by the pressure of the liquid within the rear end of the cylinder assisted by the valve springs.

The fixed openings are arranged in four longitudinal rows of four openings each. The particular arrangement, number and size of the openings depend upon the particular cushioning action desired and are best determined by experiment.

Figure 17:
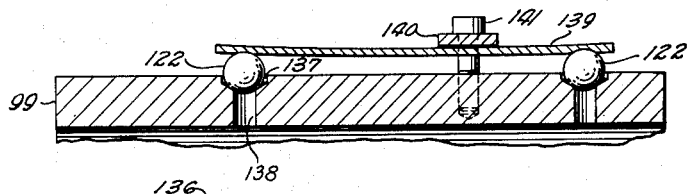
Figure 18:
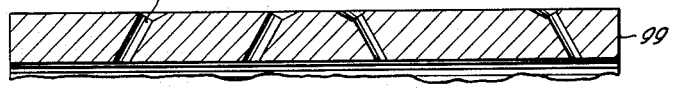
Figure 19:
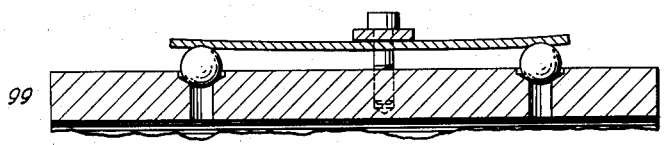
Figure 22:
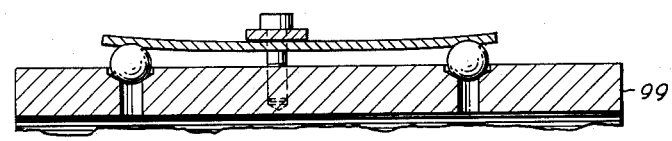
Figure 23:
Figure 24:
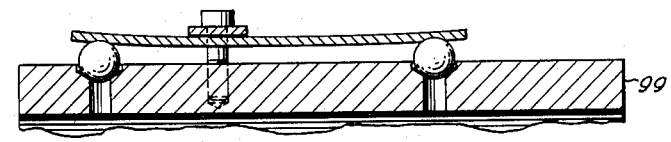

As shown in FIGS. 17, 19, 22 and 24, the high pressure relief valves 122 are in the form of ball valves which seat in recesses 137 formed in the outer periphery of the working cylinder. The balls close the ports 138 which extend through the wall of the cylinder. The pressure relief valves are arranged in four longitudinal rows about the periphery of the working cylinder and each row includes two ball valves 122 urged to closed position by a leaf spring 139 which bears upon the outer surfaces of the balls. The pressure of the spring upon the balls is regulated by means of a rider 140 which is pressed against the spring by tightening the machine screws 141 which are threaded into the wall of the cylinder and which pass through suitable holes in the outer extremities of the rider. As seen in FIG. 17, the rider 40 is positioned somewhat to the rear of the midpoint of the leaf spring 139 so that the rear ball 122 is seated with a greater force than the front ball. In FIG. 19, from the position of the fulcrum of the rider, it is seen that the seating forces on the valve balls are substantially equal. In FIG. 22, the front ball valve has greater force exerted on it by the leaf spring than the rear valve. From FIG. 24 it is seen that the front ball valve has a still greater part of the force of the leaf spring exerted upon it than the rear ball valve.

In the case of the high pressure relief valves, the disposition and pressure required to open them are determined experimentally. These valves operate when large draft or buff forces are suddenly applied to the car coupler and the valves are designed to open to avoid the build up of excessive pressures within the working cylinder.

Although the operation of the draft appliance of the invention will be largely apparent from the foregoing detained description of its construction, a brief summary of operation will be set forth with reference to FIGS. 3, 12 and 13. In making up a train of railway cars, the cars are coupled together by moving a car into coupling engagement with a stationary car. The moving car may strike the stationary car at speeds as low as ½ or 1 mile per hour or as high as 10 or 12 miles per hour. The force of impact, unless adequately cushioned, may cause damage to the cars and their lading. Consider a stationary car equipped with the draft appliance of the present invention and with the several parts of the appliance in the neutral position of FIG. 3. When a moving car approaching from the left with reference to FIG. 3 strikes the coupler 42, the coupled shank 54 is moved rearwardly until the inner end 60 of the coupler shank strikes the transverse partition 61 of the housing 38. Rearward movement is imparted to the housing 38 which slides within the center sill 30, compressing the spring 78 of the spring mechanism 44. The piston 98, being anchored through the piston rod 79 and anchor structure 43 to the center sill 30, remains relatively stationary and the housing 38 and working cylinder 99 move rearwardly with respect to the piston. Hydraulic fluid within the working cylinder in front of the piston is forced out through the fixed openings 136 in front of the piston, thereby absorbing energy and cushioning the rearward movement of the housing. Hydraulic fluid returns to the working cylinder behind the piston through the fixed openings 136 as they are uncovered by the piston and through the inwardly opening check valve 133 in the rear cylinder head 101. The decrease in effective internal volume of the hydraulic system, due to piston rod displacement thereinto, is compensated by the unit 110 which contracts in volume and prevents any substantial increase in pressure in the sealed chamber surrounding the working cylinder. Pressures within the working cylinder in front of the piston are extremely high as the housing moves rearwardly. However, pressure in the surrounding chamber 104 does not increase to any great extent due to the hydraulic fluid which flows into the chamber from the front end of the cylinder. The compensating unit 110 yields to a certain extent to accommodate this fluid, and a substantially equal volume of fluid is returned to the rear end of the cylinder through the ports 136 and the inwardly opening check valve 133 to eliminate any damaging pressure increase in the outer chamber 104. High fluid pressures in the chamber 104 are to be avoided in the completely sealed hydraulic system if the piston rod seals are not to be subjected to high pressures thereacross with attendant early breakdown and leakage of fluid.

At low coupling speeds, when the impact against the coupler 42 is not great, the fixed openings 136 provide sufficient throttling to absorb the energy. At higher coupling impacts, the ball check valve 129 in the piston 98 opens to afford passage for some of the hydraulic fluid through the piston from front to rear, thus relieving dangerously high pressures in the working cylinder and, at the same time, absorbing additional impact energy. The small fixed opening 127 in the piston 98 permits a small amount of fluid to flow from the front of the piston to the rear thereof on rearward movement of the housing.

When extremely high impact forces are encountered, not only does the ball check valve in the piston open, but also the high pressure relief valves 122 in the side of the working cylinder open to prevent the build up of unduly high pressures in the working cylinder.

If the hydraulic mechanism is incapable of absorbing all of the impact energy of coupling on the full stroke of the housing, the flange 62 at the forward end of the housing comes into abutment with the front end 36 of the center sill 30 to apply the unabsorbed impact forces directly to the center sill.

After the moving and stationary cars have been coupled, the spring 78 of the spring mechanism 44 returns the housing to the neutral position of FIG. 3.

When a train of cars has been made up and the train is started, draft forces on the coupler 42 urge the housing to move from the neutral position of FIG. 3 to the fully extended position of FIG. 13. Energy is absorbed largely by the throttling of the fluid through the fixed opening 127 in the piston and through the rearmost of the fixed openings 136 in the side wall of the working cylinder 99. It will be understood that the check valve 133 in the rear cylinder head 101 is closed and that fluid is returned to the working cylinder in front of the piston through fixed openings 136 and, if required, through the inwardly opening check valve 117 in the front cylinder head 100. The compensating unit 110 will expand, as required by withdrawal of the piston rod from the housing, to prevent the formation of a vacuum in the hydraulic system.

If the draft forces are too great to be cushioned by the hydraulic mechanism in its complete forward stroke, such forces as are not so cushioned are transmitted directly to the center sill 30 through the coupler shank key 51, the walls of the housing 38, and the upper and lower keys 55 and 57 when the latter come into abutment with the front ends of the slots 49 and 50.

When the train is in motion, the draft appliance of the invention will rarely assume the neutral position of FIG. 3. More frequently, the housing will be in some other position. For example, when the train is pulling on an upgrade, the housing assumes the full draft position of FIG. 13 with the draft forces directly applied to the center sill. On a downgrade, the cars bunch together and the housing takes the full buff position of FIG. 12 with the buff forces directly applied to the center sill. The hydraulic mechanism of the draft appliance effectively cushions movements of the housing in either direction between its limits by the use of cushioning means 200, including mainly the working cylinder 99 and the piston 98, as shown in FIG. 3 and described hereinbefore.

The draft appliance of the invention provides an efficient cushioning mechanism for all of the buff and draft shocks encountered in the make up and operation of a train of cars. The piston shaft seals are not subjected to unduly high pressures. Since the hydraulic mechanism is always completely full of fluid, frothing of the hydraulic fluid is avoided. The apparatus of the invention is easily and quickly installed in the center sills of the existing railway cars. Owing to the arrangement of the coupler keys, a coupler having a short shank may be employed with attendant advantages. The draft appliance of the invention is constructed of rugged components insuring long service life and requiring a minimum of maintenance. The draft appliance may be quickly removed from the car and replaced by another unit in the event, for example, that servicing should become necessary.

I claim:

1. In a railway car having a longitudinal center sill affixed to the car, said center sill providing a longitudinal hollow pocket adjacent one end and an opening for said pocket at said one end, and a draft appliance mounted in said pocket, said draft appliance comprising: a housing; means mounting said housing in said center sill for longitudinal sliding movement therein; cushioning means in said housing; an operating rod for said cushioning means extending longitudinally from the inner end of said housing; means anchoring said operating rod to said center sill; a coupler extending longitudinally outwardly from the outer end of said housing, the shank of said coupler being within said housing and providing a transverse keyway therethrough; said housing providing holes in opposite walls transversely aligned with said keyway, said center sill providing longitudinal slots in opposite walls transversely aligned with said keyway, said slots having openings in said one end of said center sill; a coupler key extending transversely through said keyway and said holes in said housing to substantially fix said coupler to said housing, said key extending through said slots in said center sill and being longitudinally slidable therein; first cooperating stop members on said housing and said center sill limiting inward sliding movement of said housing to a position in which said key is within said slots; and second cooperating stop members on said housing and on said center sill limiting outward sliding movement of said housing to a position in which at least a portion of said key projects outwardly from the open ends of said slots.

2. In a railway car having a longitudinal center sill affixed to the car, said center sill providing a longitudinal hollow pocket adjacent one end and an opening for said pocket at said one end, and a draft appliance mounted in said pocket, said draft appliance comprising: a housing; means mounting said housing in said center sill for longitudinal sliding movement therein; cushioning means in said housing; an operating rod for said cushioning means extending longitudinally from the inner end of said housing; means anchoring said operating rod to said center sill; a coupler extending longitudinally outwardly from the outer end of said housing, the shank of said coupler being within said housing and providing a transverse keyway therethrough; said housing providing holes in opposite walls transversely aligned with said keyway, said center sill providing longitudinal slots in opposite walls transversely aligned with said keyway, said slots having openings in said one end of said center sill; a coupler key extending transversely through said keyway and said holes in said housing to substantially fix said coupler to said housing, said key extending through said slots in said center sill and being longitudinally slidable therein; a flange member on the outer end of said housing positioned to abut said one end of said center sill to limit inward sliding movement of said housing to a position in which said key is within said slots; and cooperating stop members on said housing and on said center sill limiting outward sliding movement of said housing to a position in which at least a portion of said key projects outwardly from the open ends of said slots.

3. In a railway car having a longitudinal center sill affixed to the car, said center sill providing a longitudinal hollow pocket adjacent one end and an opening for said pocket at said one end, and a draft appliance mounted in said pocket, said draft appliance comprising: a housing; means mounting said housing in said center sill for longitudinal sliding movement therein; cushioning means in said housing; an operating rod for said cushioning means extending longitudinally from the inner end of said housing; means anchoring said operating rod to said center sill; a coupler extending longitudinally outwardly from the outer end of said housing, the shank of said coupler being within said housing and providing a transverse keyway therethrough; said housing providing holes in opposite walls transversely aligned with said keyway, said center sill providing longitudinal slots in opposite walls transversely aligned with said keyway, said slots having openings in said one end of said center sill; a coupler key extending transversely through said keyway and said holes in said housing to substantially fix said coupler to said housing, said key extending through said slots in said center sill and being longitudinally slidable therein; cooperating stop members on said housing and said center sill limiting inward sliding movement of said housing to a position in which said key is within said slots; a stop key extending through said housing and said center sill and positioned inwardly of said coupler key, said stop key being fixed to said housing, said center sill providing a second pair of longitudinal slots having closed outer ends positioned to be struck by said stop key to limit outward sliding movement of said housing to a position in which at least a portion of said coupler key projects outwardly from the open ends of said first mentioned slots.

4. In a railway car having a longitudinal center sill affixed to the car, said center sill providing a longitudinal hollow pocket adjacent one end and an opening for said pocket at said one end, and a draft appliance mounted in said pocket, said draft appliance comprising: a housing; means mounting said housing in said center sill for longitudinal sliding movement therein; cushioning means in said housing; an operating rod for said cushioning means extending longitudinally from the inner end of said housing; means anchoring said operating rod to said center sill; a coupler extending longitudinally outwardly from the outer end of said housing, the shank of said coupler being within said housing and providing a transverse keyway therethrough; said housing providing holes in opposite walls transversely aligned with said keyway, said center sill providing longitudinal slots in opposite walls transversely aligned with said keyway, said slots having openings in said one end of said center sill; a coupler key extending transversely through said keyway and said holes in said housing to substantially fix said coupler to said housing, said key extending through said slots in said center sill and being longitudinally slidable therein; cooperating stop members on said housing and said center sill limiting inward sliding movement of said housing to a position in which said key is within said slots; a pair of stop keys extending through said housing and said center sill and positioned inwardly of and parallel to said coupler key and on either side of the latter, each said stop key being fixed to said housing, said center sill providing for each said stop key a pair of longitudinal slots having closed outer ends positioned to be struck by the stop key to limit outward sliding movement of said housing to a position in which at least a portion of said coupler key projects outwardly from the open ends of said first mentioned slots.

5. In a railway car having a longitudinal center sill affixed to the car, said center sill providing a longitudinal hollow pocket adjacent one end and an opening for said pocket at said one end, and a draft appliance mounted in said pocket, said draft appliance comprising: a housing; means mounting said housing in said center sill for longitudinal sliding movement therein; cushioning means in said housing; an operating rod for said cushioning means extending longitudinally from the inner end of said housing; means anchoring said operating rod to said center sill; a coupler extending longitudinally outwardly from the outer end of said housing, the shank of said coupler being within said housing and providing a transverse keyway therethrough; said housing providing holes in opposite walls transversely aligned with said keyway, said center sill providing longitudinal slots in opposite walls transversely aligned with said keyway, said slots having openings in said one end of said center sill; a coupler key extending transversely through said keyway and said holes in said housing to substantially fix said coupler to said housing, said key extending through said slots in said center sill and being longitudinally slidable therein; a flange member on the outer end of said housing positioned to abut said one end of said center sill to limit inward sliding movement of said housing to a position in which said key is within said slots; a pair of stop keys extending through said housing and said center sill and positioned inwardly of and parallel to said coupler key and on either side of the latter, each said stop key being fixed to said housing, said center sill providing for each said stop key a pair of longitudinal slots having closed outer ends positioned to be struck by the stop key to limit outward sliding movement of said housing to a position in which at least a portion of said coupler key projects outwardly from the open ends of said first mentioned slots.

6. In a railway car having a longitudinal center sill affixed to the car, said center sill providing a longitudinal hollow pocket adjacent one end and an opening for said pocket at said one end; and a draft appliance mounted in said pocket, said draft appliance comprising: a housing; means mounting said housing in said center sill for longitudinal sliding movement therein; cushioning means in said housing; an operating rod for said cushioning means extending longitudinally from the inner end of said housing; means anchoring said operating rod to said center sill; a coupler; means securing said coupler to said housing; cooperating stop members on said housing and on said center sill permitting limited longitudinal movement of said housing in said center sill; and a spring mechanism biasing said housing to return to a neutral position intermediate its limits of longitudinal movement upon displacement in either direction from said neutral position, said spring mechanism including tie rod mounting means fixed to said housing and projecting outside said center sill; a tie rod fixed to said mounting means and extending outside said center sill parallel to the axis of movement of said housing and in an inward direction; a yoke bar slidable on said tie rod; stop means on said tie rod and said yoke bar limiting inward movement of said yoke bar on said tie rod; a compression spring acting between said mounting means and said yoke bar to urge said yoke bar in an inward direction; a bracket mounted on said center sill outwardly of said yoke bar; means limiting inward movement of said yoke bar with respect to said bracket; and compression spring means acting between said yoke bar and said bracket to urge said yoke bar in an inward direction.

7. In a railway car having a longitudinal center sill affixed to the car, said center sill providing a longitudinal hollow pocket adjacent one end and an opening for said pocket at said one end; and a draft appliance mounted in said pocket, said draft appliance comprising: a housing; means mounting said housing in said center sill for longitudinal sliding movement therein; cushioning means in said housing; an operating rod for said cushioning means extending longitudinally from the inner end of said housing; means anchoring said operating rod to said center sill; a coupler; means securing said coupler to said housing; cooperating stop members on said housing and on said center sill permitting limited longitudinal movement of said housing in said center sill; and a spring mechanism biasing said housing to return to a neutral position, said spring mechanism including tie rod mounting means fixed to said housing and projecting outside said center sill; a tie rod fixed to said mounting means and extending outside said center sill parallel to the axis of movement of said housing and in an inward direction; a yoke bar slidable on said tie rod and having opposed arms extending on either side of said tie rod; stop means on said tie rod and said yoke bar limiting inward movement of said yoke bar on said tie rod; a compression spring wrapped around said tie rod and urging said yoke bar in an inward direction; a bracket mounted on said center sill outwardly of said yoke bar; a pair of inwardly extending guide rods carried by said bracket and extending inwardly parallel to said tie rod on either side of the latter, the opposed arms of said yoke bar being slidably mounted on said guide rods; stop means on said guide rods and the arms of said yoke bar limiting inward movement of said yoke bar on said guide rods; and compression springs wrapped around said guide rods and urging said yoke bar in an inward direction.

8. A double-acting, shock-resisting hydraulic buffer mechanism comprising: a hermetically sealed housing, a cylinder mounted in said housing and spaced from the inner walls thereof to provide with said housing a chamber about the cylinder, said cylinder having openings establishing communication between said chamber and the cylinder, a piston reciprocable in said cylinder, a piston rod connected to said piston and reciprocably extending to the exterior through one of the walls of said cylinder and sealingly through said housing, the openings in said cylinder being disposed in a pair of groups at opposite ends of said cylinder, and check valve means in said piston establishing communication between the cylinder chambers on opposite sides of said piston.

9. A double-acting, shock-resisting hydraulic buffer mechanism as defined in claim 8 wherein said check valve means opens toward the wall of said cylinder through which said piston rod extends.

10. A double-acting, shock-resisting hydraulic buffer mechanism as defined in claim 9 including spring means urging said check valve to closed position.

11. A shock-resisting hydraulic mechanism comprising: a housing; a cylinder having end and side walls mounted in said housing and providing a chamber between said cylinder and said housing, a wall of said cylinder having openings between said cylinder and said chamber; a piston reciprocable in said cylinder between its end walls; a piston rod connected to the piston and reciprocably extending to the exterior through one of the end walls of said cylinder and sealingly through said housing; a guide rod connected to the piston and reciprocably extending through the other of the end walls of said cylinder and terminating in said chamber, said chamber being completely filled with a non-compressible fluid; and a compensating device mounted in said chamber and exposed to the fluid therein, said compensating device including a member collapsible and expansible in the direction of reciprocation of said piston under the influence of fluid pressure changes incurred from piston rod displacement, said compensating device member being positioned to be contacted by said guide rod and forcibly collapsed by said guide rod upon final inward movement of said piston rod.

12. A shock-resisting hydraulic mechanism comprising: a housing; a cylinder having end and side walls mounted in said housing and providing a chamber between said cylinder and said housing, a wall of said cylinder having openings between said cylinder and said chamber; a piston riciprocable in said cylinder between its end walls; a piston rod connected to the piston and reciprocably extending to the exterior through one of the end walls of said cylinder and sealingly through said housing; a guide rod connected to the piston and reciprocably extending through the other of the end walls of said cylinder and terminating in said chamber, said chamber being completely filled with a non-compressible fluid; and a compensating device mounted in said chamber and exposed to the fluid therein, said compensating device including a hermetically sealed container member containing gas and adapted to expand and collapse in the direction of reciprocation of said piston under the influence of fluid pressure changes incurred from piston rod displacement, said compensating device container member being positioned to be contacted by said guide rod and forcibly collapsed by said guide rod upon final inward movement of said piston rod.

13. A shock-resisting hydraulic mechanism comprising: a housing; a cylinder having end and side walls mounted in said housing and providing a chamber between said cylinder and said housing, a wall of said cylinder having openings between said cylinder and said chamber; a piston reciprocable in said cylinder between its end walls; a piston rod connected to the piston and reciprocably extending to the exterior through one of the end walls of said cylinder and sealingly through said housing; a guide rod connected to the piston and reciprocably extending through the other of the end walls of said cylinder and terminating in said chamber, said chamber being completely filled with a non-compressible fluid; and a compensating device mounted in said chamber and exposed to the fluid therein, said compensating device including a hermetically sealed container member containing gas and adapted to expand and collapse in the direction of reciprocation of said piston under the influence of fluid pressure changes incurred from piston rod displacement, said compensating device container member having a recess in one face thereof and being positioned so that the inner end of said recess is contacted by the terminal end of said guide rod to forcibly collapse said container member upon final inward movement of said guide rod.

References Cited by the Examiner

UNITED STATES PATENTS

| | | | |
|---|---|---|---|
| 2,220,101 | 11/40 | Hall | 213—8 |
| 2,453,855 | 11/48 | Oliver | 188—100 |
| 2,816,670 | 12/57 | Edwards et al. | 213—43 |
| 2,944,639 | 7/60 | Blake | 188—97 |
| 2,944,681 | 7/60 | Blake | 213—223 X |
| 3,047,162 | 7/62 | Blake | 213—8 |

MILTON BUCHLER, *Primary Examiner.*

JAMES S. SHANK, LEO QUACKENBUSH, *Examiners.*